US011948129B2

(12) United States Patent
Gordon et al.

(10) Patent No.: US 11,948,129 B2
(45) Date of Patent: Apr. 2, 2024

(54) METRICS-BASED PLANNING AND SCHEDULING SYSTEM

(71) Applicant: Raytheon Company, Tewksbury, MA (US)

(72) Inventors: Laura A. Gordon, Aurora, CO (US); Laura D. Strater, Carrollton, TX (US); Benjamin Gothman, Carrollton, TX (US); Kristin Guillaume, Colorado Springs, CO (US)

(73) Assignee: Raytheon Company, Tewksbury, MA (US)

( * ) Notice: Subject to any disclaimer, the term of this patent is extended or adjusted under 35 U.S.C. 154(b) by 23 days.

(21) Appl. No.: 17/557,797

(22) Filed: Dec. 21, 2021

(65) Prior Publication Data
US 2023/0196303 A1    Jun. 22, 2023

(51) Int. Cl.
*G06Q 10/1093* (2023.01)
(52) U.S. Cl.
CPC ................ *G06Q 10/1097* (2013.01)
(58) Field of Classification Search
CPC ......... G06Q 10/06311; G06Q 10/1097; G06Q 10/06313
See application file for complete search history.

(56) References Cited

U.S. PATENT DOCUMENTS

| 7,716,592 | B2 | 5/2010 | Tien et al. |
| 8,973,132 | B2 | 3/2015 | Smith et al. |
| 9,659,108 | B2 | 5/2017 | Lightner et al. |
| 10,372,769 | B2 | 8/2019 | Chandnani et al. |
| 10,444,941 | B2 | 10/2019 | Cervelli et al. |
| 2003/0041238 | A1* | 2/2003 | French .................. H04L 41/12 713/153 |
| 2007/0174770 | A1* | 7/2007 | Safoutin ............. G06F 16/9537 340/995.1 |

(Continued)

FOREIGN PATENT DOCUMENTS

| EP | 3792847 A1 | 3/2021 |
| WO | WO-2023122086 A1 | 6/2023 |

OTHER PUBLICATIONS

Schneider et al, A-Plan: Integrating Interactive Visualization with Automated Planning for Cooperative Resource Scheduling, i-Know '11: Proceedings of the 11th International Conference on Knowledge Management and Knowledge Technologies, Sep. 2011 Article No. 44 pp. 1-8 (Year: 2011).*

(Continued)

*Primary Examiner* — Andre D Boyce
(74) *Attorney, Agent, or Firm* — Schwegman Lundberg & Woessner, P.A.

(57) ABSTRACT

A system includes a computer processor, a computer memory, and a user interface. The system receives a plurality of tasks, data relating to conditions and environments associated with the plurality of tasks, and a plurality of goals relating to planning and scheduling of the plurality of tasks. The goals are received from a plurality of sources, and the goals are addressed as a function of the conditions and environments. The system displays on the user interface, as a function of the plurality of goals, an analytical view of the conditions and environments relating to the plurality of tasks and an analytical view of a status of the plurality of tasks.

17 Claims, 6 Drawing Sheets

(56) References Cited

U.S. PATENT DOCUMENTS

| | | | | |
|---|---|---|---|---|
| 2014/0074534 | A1* | 3/2014 | Hamilton | G06Q 10/10 |
| | | | | 705/7.19 |
| 2017/0323081 | A1* | 11/2017 | Govro | G16H 10/20 |
| 2018/0260253 | A1* | 9/2018 | Nanda | G06F 11/3476 |
| 2019/0370909 | A1* | 12/2019 | Dyer | G06F 1/1626 |
| 2022/0253076 | A1* | 8/2022 | Cleland-Huang | H04W 4/30 |

OTHER PUBLICATIONS

Shi et al, Intelligent scheduling of discrete automated production line via deep reinforcement learning, International Journal of Production Research, Jan. 2020 (Year: 2020).*

"International Application Serial No. PCT/US2022/053503, International Search Report dated Apr. 21, 2023", 4 pgs.

"International Application Serial No. PCT/US2022/053503, Written Opinion dated Apr. 21, 2023", 5 pgs.

* cited by examiner

METRICS-BASED PLANNING AND SCHEDULING SYSTEM

TECHNICAL FIELD

The present disclosure relates to a metrics-based planning and scheduling system, and in an embodiment, but not by way of limitation, a metrics-based planning and scheduling dashboard and user interface.

BACKGROUND

The planning and scheduling of logistical systems and operations, such as satellite constellations, package delivery systems, and industrial operations, normally involve the efforts of an operator. The operator typically interacts with an operator interface, which displays data relating to the operations of the system or environment. However, current processes are typically slow and manual, so planning and scheduling operators have a difficult time trying to optimize scheduling to meet diverse goals, such as collecting as much data as possible in a satellite constellation or getting a minimum number of packages delivered during a particular time period. As such systems grow in size, the problem is compounded due to the amount of information an operator must analyze. Additionally, operator goals are dynamic, with priorities shilling as operation needs and requirements change over time.

DETAILED DESCRIPTION

Figure 1:
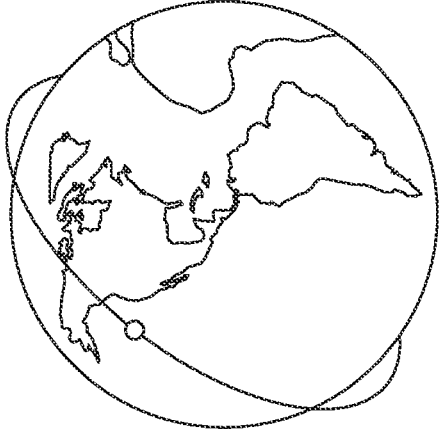
FIG. 1 illustrates a prior art satellite user interface.

In the following description, for purposes of explanation, numerous specific details are set forth in order to provide a thorough understanding of the various aspects of different embodiments of the present invention. It will be evident, however, to one skilled in the art, that the present invention may be practiced without all the specific details and/or with variations, permutations, and combinations of the various features and elements described herein.

As noted above, the planning and scheduling of logistical systems and operations, such as satellite constellations, package delivery systems, and industrial environments, normally involve the efforts of an operator. The operator typically interacts with an operator interface, which displays data relating to the operations of the system and/or environment. However, current processes are typically slow and manual, so planning and scheduling operators have a difficult time trying to optimize scheduling to meet diverse goals. For example, in particular, past and current satellite operator interfaces simply display the data planned to be collected by satellites, in a non-analytical format, and some of these interfaces only display the data for one satellite at a time. In contrast, an embodiment of this disclosure can be used to analyze operating conditions and environments of a plurality of satellites in a satellite constellation, and the embodiment can display such conditions and environments in an analytical fashion as a function of one or more mission goals.

Therefore, in the satellite constellation context, a general goal of an embodiment of the present disclosure is to maximize every second of satellite time for all satellites in a satellite constellation by imaging or collecting as much data as possible from the proper geographic areas (in a package delivery system, the general goal may be to deliver as many packages as can be delivered on a particular day while minimizing the distance traveled). Another general goal is to provide the highest quality data by efficiently scheduling satellite operations in the satellite constellation. To achieve these goals, a high-level conceptual plan is developed for the satellite operations schedule based on collection deck collection parameters (that is, what types and amounts of data are to be collected as dictated by customer orders and requests), the satellites and other resources that are available, and constraints in the satellite constellation. The planning and scheduling involve generating a geospatial understanding of the collection deck. The planning and scheduling further involve generating an understanding of the opportunities for the collection of data, such as understanding data collection opportunities based on the location of satellites and other resources, maximizing clear weather collection opportunities, and maximizing exceptional or unusual collection opportunities. Finally, in developing a plan and schedule, an understanding of collection deck constraints must be understood.

In satellite systems, there is normally an automated schedule that controls the operations and data collection of the satellite constellation (similarly, in the package delivery context, there is normally a set schedule of deliveries based on the resources available such as drivers and trucks). This automated schedule can be maintained in a backend satellite constellation database. To further achieve the above-stated goals, the automated system metrics should be improved in key areas. For example, the metrics of collection deck coverage and collection value should be maximized. Also, customer orders should be completed in a timely manner. Further, gaps in the collection of data by the satellites should be minimized. Additionally, various options should be considered without impacting the current automated scheduling plan, and in general, customer good will should be generated.

Another goal of the analytics-based satellite operator user interface includes optimizing the automated schedule for dynamic and/or anomalous situations or events. This optimization can be accomplished by maximizing exceptional or unusual collection opportunities (e.g., once again, unusually clear areas). Also, clear weather collections can be maximized in connection with using the best collection satellites or other resources. Yet another goal could be to minimize the impact of system outages or failures, and to ensure that high value or high priority collections stay on schedule. Finally, unusual collection requests or constraints can be prioritized.

Another goal of the analytics-based satellite operator user interface is to enable an operator to better coordinate with product owners, stakeholders, customers and other planners to meet customer needs. This involves understanding the status and priority of customer requests and customer needs to meet internal and external expectations, clarifying customer needs to help get activities on the schedule, understanding why a collection activity is not getting scheduled, and identifying modifications that will allow the meeting of the mission goals of the system, which are at times conflicting.

In view of the above, in an embodiment, an analytics-based dashboard of planning and scheduling allows operators to select a driving metric (or mission goal) in order to modify and pivot analytical views of traditional displays. These analytical views can include, for example, maps, timelines, and tasking lists. In the context of a satellite constellation, a traditional satellite user interface is altered to allow for the display of analytical data (such as heatmaps) across higher level groupings of information (such as geographic areas, customer groups, or tasking priorities). The displayed analytics are pluggable so that mission-specific goals can be accounted for based on operational need. Example driving metrics may include collection order (tasking) coverage, collection values, collection gaps, or customer goodwill. The analytics-based dashboard allows operators to focus on specific mission-oriented goals by adding analytics as needed.

In short, embodiments of this disclosure relate to the way a user can view information based on goals. Embodiments apply to any scheduling task where the user has different and often competing goals. For example, in the context of a package delivery system, the different and competing goals could be one or more of conserving fuel, delivering important packages soonest, delivering the most packages, or finishing deliveries as quickly as possible. That is, embodiments relate to any dashboard that is presenting information to a user who has a diverse, but known, set of goals. The system is able to pivot a data view to see how well, or to see how not so well, different goals are met. These goals are shown via heatmap views in a chart, a map, a schedule, etc.

Figure 2:
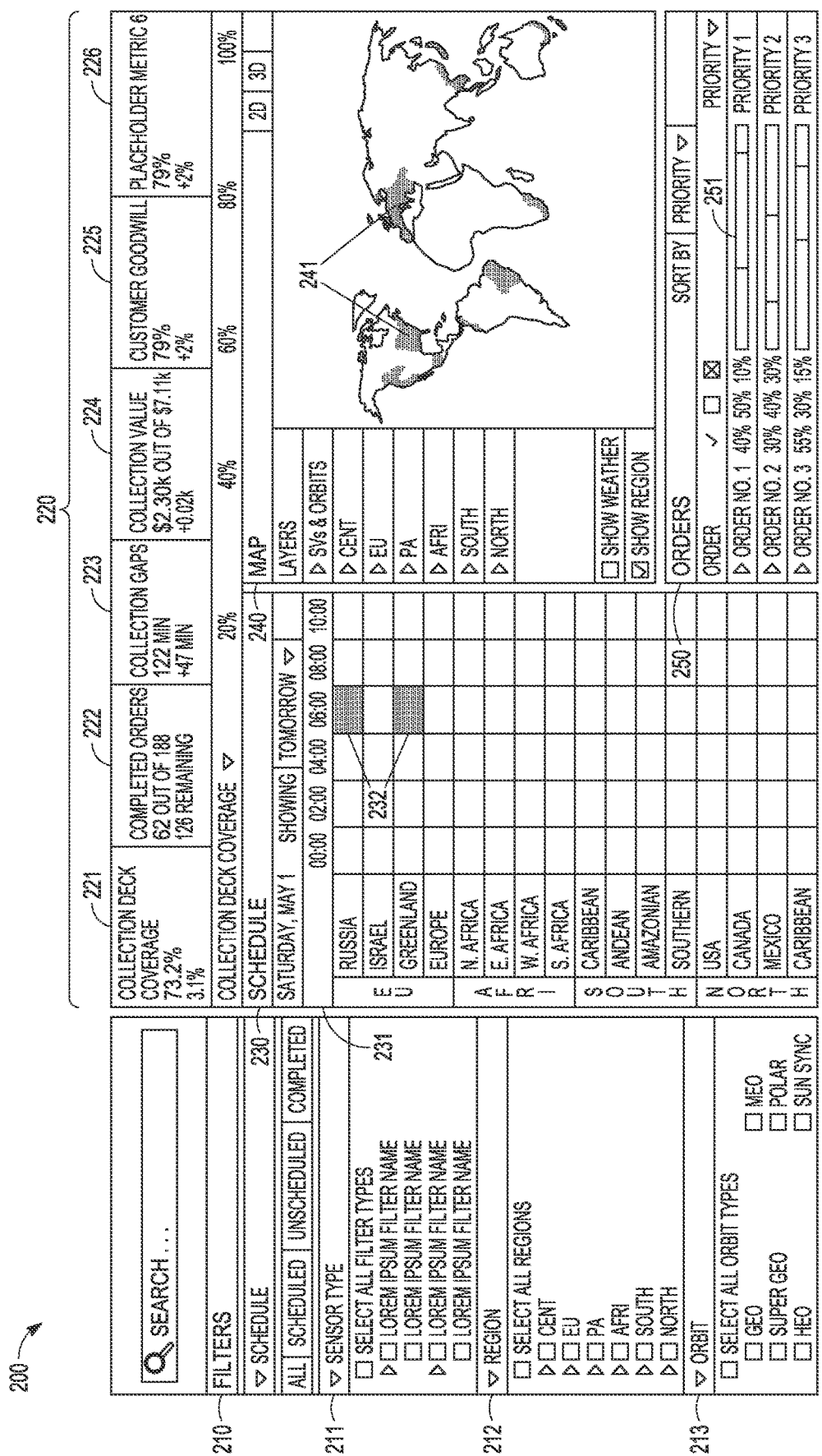
FIG. 2 illustrates an example embodiment of an analytics-based dashboard for satellite planning and scheduling.

While the figures in this disclosure are directed to a satellite system, as noted above, the embodiments of this disclosure can be applied to other types of logistical systems such as package delivery systems or industrial plant systems. Referring to FIG. 2, an analytics-based satellite operator (or user) user-interface scheduler and planner 200 includes a filter section 210, a driving metrics or optimization goal section 220, a schedule analytics section 230, a map analytics section 240, and an order tasking analytics section 250.

The filter section 210 permits an operator/user to apply various filters in the system, which then results in an update of all the analytic displays; that is, the schedule analytics section 230, the map analytics section 240, and the order tasking analytics section 250. Using the filter, the operator can narrow down data as a function of any filter parameters, which in the example of FIG. 2 include a particular satellite and/or sensor type 211, a particular geographic region 212, and a particular orbital regime 213.

The driving metrics or optimization goal section 220 permits an operator to select a particular driving metric (optimization goal), and the selected metric drives and determines the analytic data that are shown in the schedule, map, and orders displays. In the embodiment of FIG. 2, the operator can select as a driving metric the coverage of the collection deck 221, completed orders 222, collection gaps 223, collection value 224, and customer goodwill 225. As indicated at 226, other driving metrics can be added via a placeholder. The driving metric includes a current value over a measurement timeframe and a change from a previous timeframe. For example, at the coverage of the collection deck 221, 73.2% of the data have been collected, and this is an increase of 3.1% from a previous time period. As will be discussed in connection with FIG. 3, a metric key is used to determine the heatmap color values. Selecting a different metric changes the heatmap coverage of the schedule and map display.

The schedule analytics section 230 displays a heatmap view 231 instead of a traditional schedule Gantt chart or other traditional view. As illustrated in FIG. 1, prior art satellite user interfaces normally only display the information relating to a single satellite, and further do not display the information/data in an analytical manner. In contrast, in the interface of FIG. 2, the data are displayed in an analytical fashion and the data are grouped via geospatial regions. In a different embodiment, the data could be grouped by a different attribute such as satellite type or ownership. As noted, these groupings of data in the schedule analytics section 230 are different than the traditional resource-based view of current satellite user interfaces. The heatmap 231 of the schedule analytics section 230 permits an operator to see 'hot spots' where schedule optimization may be necessary.

The map analytics section 240 displays a heatmap view instead of traditional orbits (as illustrated in FIG. 1), fields of view, etc. As with the schedule analytics section 230, the heat map of the map analytics section 240 allows operators to see 'hot spots' 241 where schedule optimization may be necessary.

The order analytics tasking section 250 groups data via geospatial regions (or other attributes) versus the traditional individual task view (see FIG. 1). The order analytics section displays an analytical bar graph 251. The order analytics tasking section further displays additional analytics for order satisfaction, such as order priority.

Figure 4A:
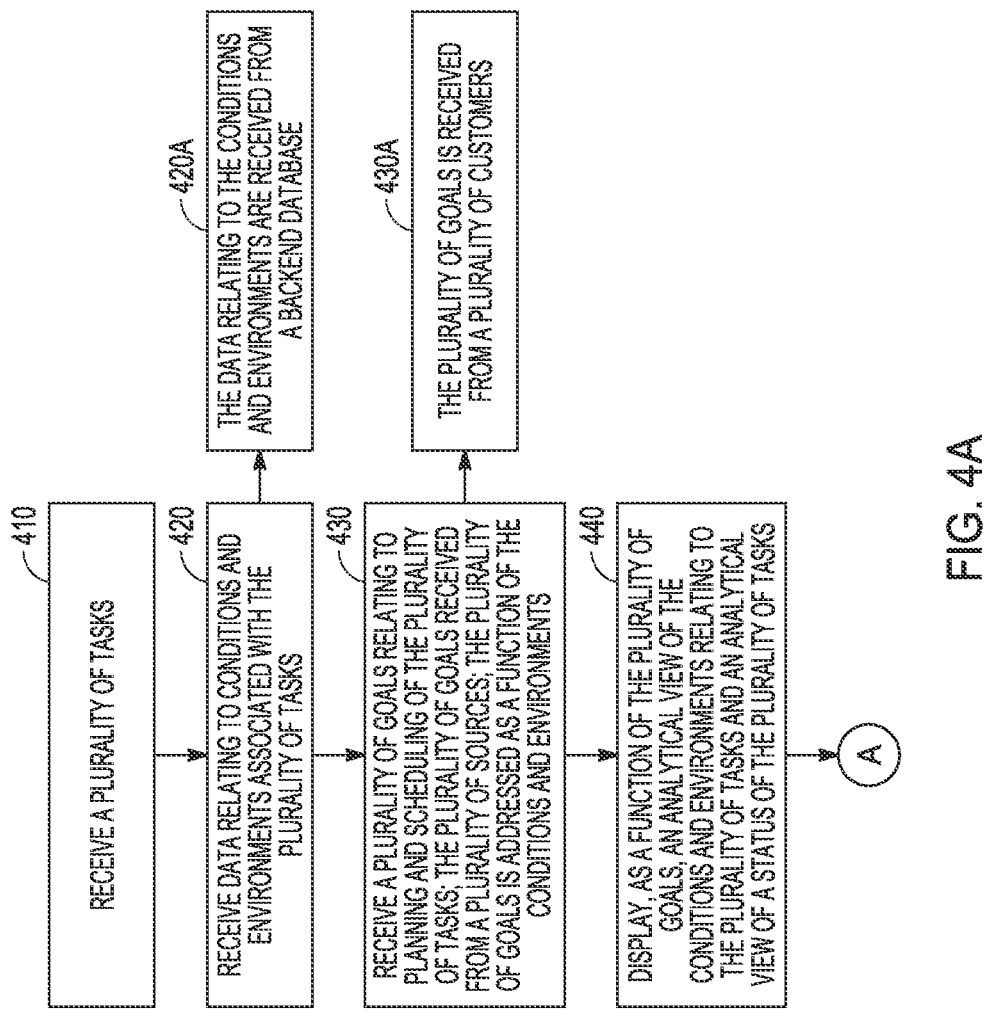
FIGS. 4A and 4B are a block diagram illustrating features and operations of an analytics-based dashboard for satellite planning and scheduling.
Figure 4B:
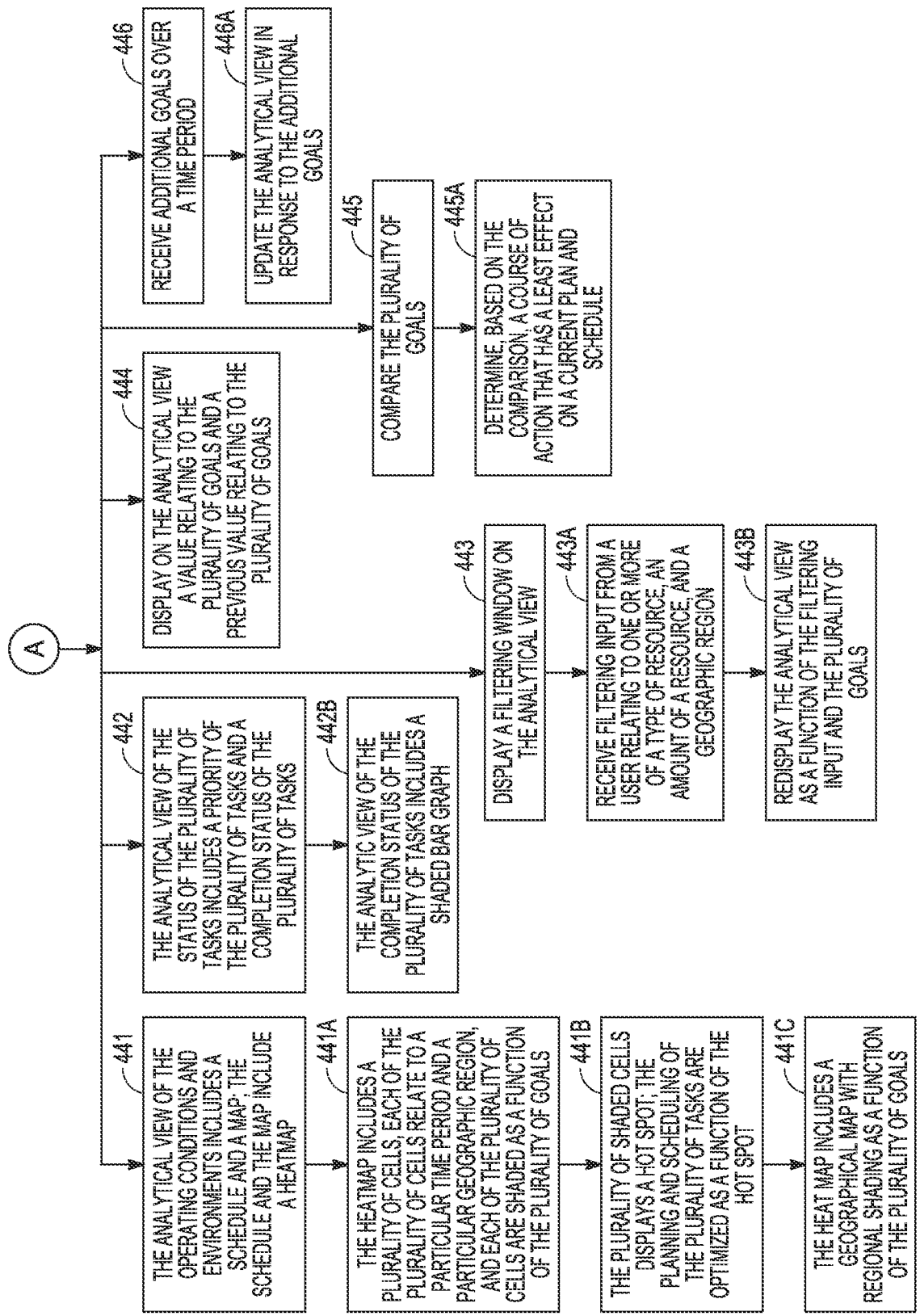

FIGS. 4A and 4B are a block diagram illustrating features and operations of an analytics-based dashboard for planning and scheduling. FIGS. 4A and 4B include a number of feature and process blocks 410-446A. Though arranged substantially serially in the example of FIGS. 4A and 4B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 4A and 4B, a process for generating a metrics-based analytical user includes, at 410, receiving into a computer processor a plurality of tasks. As previously noted, these tasks can relate to many situations, systems, and environments, such as satellite constellations, package delivery systems, and industrial or factory environments.

At 420, data are received that relate to conditions and environments associated with the plurality of tasks. In an embodiment, the data relating to the conditions and environments are received from a backend database (420A).

At 430, a plurality of goals is received that relate to planning and scheduling of the plurality of tasks. These goals can be received from a plurality of sources, and these goals are addressed as a function of the conditions and environments associated with the tasks. As indicated at 430A, this plurality of sources can be a plurality of customers. Because these many goals can be received from many different customers, these goals can be competing, and these competing goals affect the display of the analytical data on the user interface.

For example, in a package delivery system, the schedule map 230 may display shaded values based on the number of trucks in a certain geographical area. As noted, these data and information are received from a backend schedule. If an operator adds and/or changes a goal, such as adding and/or changing the goal from saving fuel to delivering the highest priority packages first, the system can analyze in which geographic areas the high priority packages are scheduled to be delivered and the kinds and number of trucks scheduled for delivery in those geographic areas. The heat map will then be updated to reflect not the former goal of saving fuel (which may have highlighted the schedule map cells relating to shorter routes and smaller trucks) to reflect the goal of delivering the highest priority packages first (which may highlight the schedule map cells that simply have the most available trucks). If the heatmap reflects that the geographical area in which the highest priority packages must be delivered first has a shortage of trucks, and a different geographical area has a surplus of trucks, then the operator can reassign the trucks accordingly to meet this added or changed goal. This feature is noted in FIG. 4B at 446, wherein additional goals can be received over time, and the analytical view in then updated in response to the additional goals (446A). This plug-in capability permits the goals to be data driven and configurable.

At 440, an analytical view of the conditions and environments relating to the tasks are displayed on the user interface as a function of the plurality of goals, and further an analytical view of the status of the plurality of tasks is displayed. As illustrated in FIG. 2, at 221, a value relating to the plurality of goals and a previous value relating to the plurality of goals can be displayed on the user interface (444). These values indicate the degree to which the scheduling and planning system is improving (or not improving) over a period of time.

Referring also back to FIG. 2, as previously noted, the analytical view of the operating conditions and environments includes the schedule analytics section 230, the map analytics section 240, and the order tasking analytics section 250. The schedule analytics section 230 and the map analytics section 240 include a heatmap (441). As can be gleaned from FIG. 2, the heatmap associated with the schedule analytics section 230 includes a plurality of cells, each of the plurality of cells relates to a particular time period and a particular geographic region, and each of the plurality of cells is shaded as a function of the plurality of goals (441A). As will be discussed below in connection with FIG. 3, these data and information that appear on the schedule analytics section 230 and the map analytics section 240 are retrieved from a satellite constellation backend database, stored in a file according to a particular data structure, and then displayed in the analytical format of FIG. 2. As indicated at 441B, the plurality of cells can display a hot spot, such as at 232, which in this instance may indicate that there are many satellites available for the collection of data at the time of 6:00 in Europe, especially in Russia and Greenland, and the operator can react accordingly to optimize the planning and scheduling of the satellited constellation system as a function of the identified hot spot. While only one hot spot is noted in FIG. 2 for illustration purposes, in an actual system, there could be multiple hot spots. Additionally, in an actual system, the vast majority of the cells with have some shading or color indicator associated with them, all indicating a degree of importance as a function of the current goal or goals. As indicated at 441C, the map analytics section 240 can include a heat map also, for example indicating the availability of satellites in particular regions 241.

The analytical view further can include a status of the plurality of tasks (442, 250), and this can include a priority of the plurality of tasks and a completion status of the plurality of tasks (442A). As can be gleaned from FIG. 2, the analytic view of the completion status of the plurality of tasks can include a shaded bar graph 251.

Figure 3:
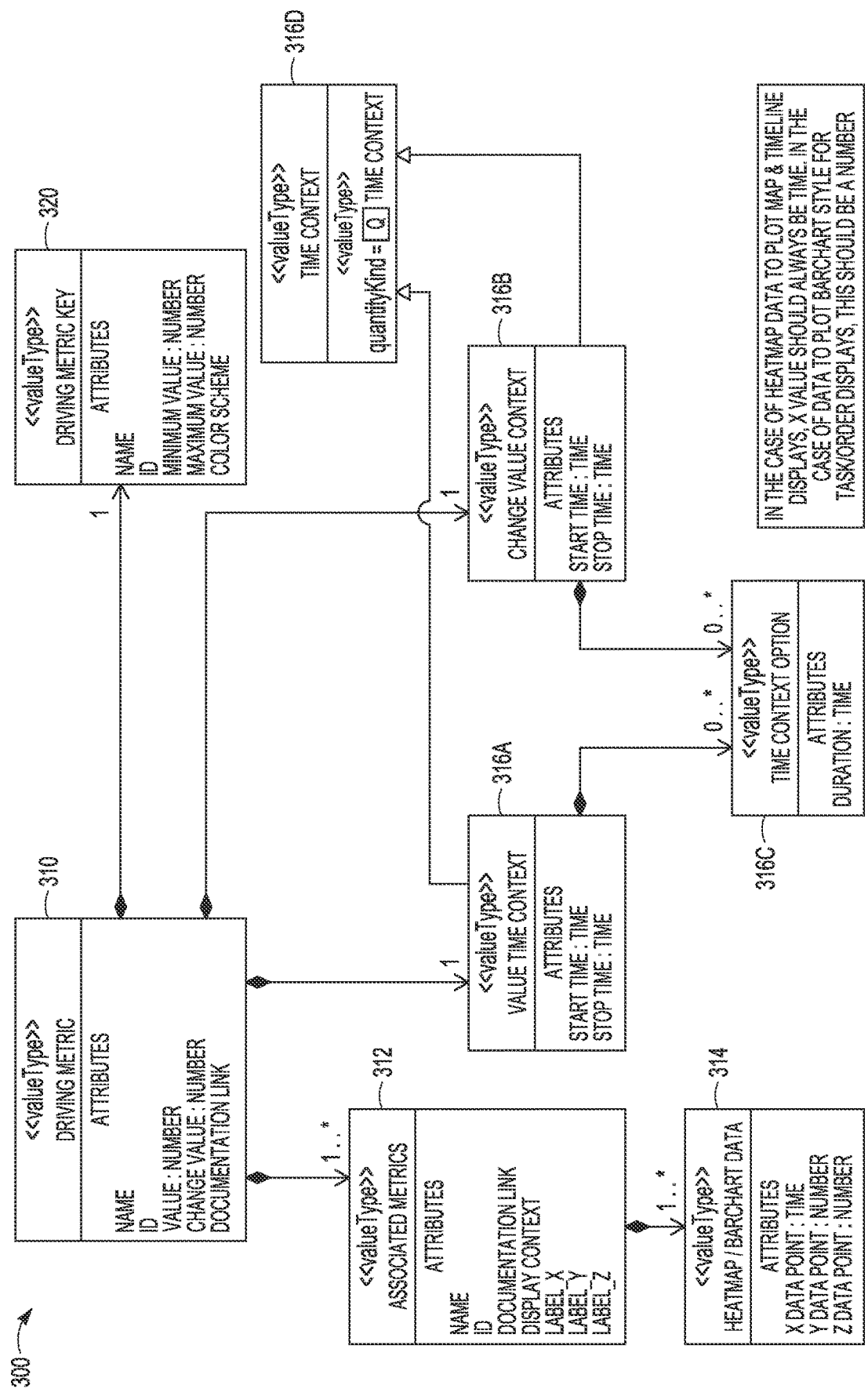
FIG. 3 illustrates an example data model architecture for implementation of an analytics-based dashboard for satellite planning and scheduling.

Refuting to FIG. 3, an example data structure 300 for a planning and scheduling user interface is illustrated. Data from a backend database, such as a satellite constellation or package delivery system database, are retrieved from the backend database, and stored according to the data structure of FIG. 3. This file is then used to retrieve the data for display on the user interface 200. The data structure 300 includes driving metric 310 and driving metric key 320. The driving metric is a goal of the system, such as collecting the most image data in a satellite system or delivering the most packages in a package delivery system. The driving metric key can include a minimum and maximum value. For example, in a satellite system, the minimum value can be a minimum number of images that must be captured. In a package delivery system, the maximum number can be the maximum number of packages that can be delivered in a day, because of, for example, a constraint on the number of drivers and/or trucks. The driving metric key can also indicate a feature of the heat map, such as the indicative colors to be displayed on the heat map. The driving metric 310 can include an associated metric 312 and heatmap/bar chart data 314. The associated metric 312 can be used for labeling the schedule map 230 (e.g., Europe and Asia) and indicating associated data such as cloud cover, and the heatmap/bar chart data 314 provides data as to where to place the cells on the user interface and the color or heat intensity of the map. The value time context 316A, the change value context 316B, the time context options 316C, and the time context 316D affect the time scale heading of the schedule heat map.

Returning to FIG. 4, at 443, a filtering window is displayed on the analytical view. The filtering window, in the example of a satellite constellation system can include information relating the types of satellites, the types of sensors on the satellite, the regions covered by the satellite, and the orbits of the satellites. In a package delivery system, the filter may include information on the type of trucks (semi-trailer, flat bed, box, etc.) and the permitted routes for the trucks. At 443A, filtering input relating to one or more of a type of resource, an amount of a resource, and a geographic region is received from a user. Then, at 443B, the analytic views (the schedule analytics section 230, the map analytics section 240, and the order tasking analytics section 250) are redisplayed as a function of the filtering input and the plurality of goals.

As indicated at 445, the plurality of goals can be compared, and then based on the comparison, a course of action can be determined that has a least effect on a current plan and schedule (445A).

EXAMPLES

Example No. 1 is a process for generating a user interface including receiving into a computer processor a plurality of tasks; receiving into the computer processor data relating to conditions and environments associated with the plurality of tasks; receiving into the computer processor a plurality of goals relating to planning and scheduling of the plurality of tasks, wherein the plurality of goals is received from a plurality of sources, and wherein the plurality of goals is addressed as a function of the conditions and environments; and displaying on the user interface, as a function of the plurality of goals, an analytical view of the conditions and environments relating to the plurality of tasks and an analytical view of a status of the plurality of tasks.

Example No. 2 includes the features of Example No. 1, and optionally includes a process wherein the analytical view of the operating conditions and environments comprises a schedule and a map; and wherein the schedule and the map comprise a heatmap.

Example No. 3 includes the features of Example Nos. 1-2, and optionally includes a process wherein the heatmap comprises a plurality of cells, each of the plurality of cells relating to a particular time period and a particular geographic region, and each of the plurality of cells shaded as a function of the plurality of goals.

Example No. 4 includes the features of Example Nos. 1-3, and optionally includes a process wherein the plurality of shaded cells displays a hot spot; and comprising optimizing the planning and scheduling of the plurality of tasks as a function of the hot spot.

Example No. 5 includes the features of Example Nos. 1-4, and optionally includes a process wherein the heat map comprises a geographical map with regional shading as a function of the plurality of goals.

Example No. 6 includes the features of Example Nos. 1-5, and optionally includes a process wherein the analytical view of a status of the plurality of tasks comprises a priority of the plurality of tasks and a completion status of the plurality of tasks.

Example No. 7 includes the features of Example Nos. 1-6, and optionally includes a process wherein the analytic view of the completion status of the plurality of tasks comprises a shaded bar graph.

Example No. 8 includes the features of Example Nos. 1-7, and optionally includes a process including displaying a filtering window on the analytical view; receiving filtering input from a user relating to one or more of a type of resource, an amount of a resource, and a geographic region; and redisplaying the analytical view as a function of the filtering input and the plurality of goals.

Example No. 9 includes the features of Example Nos. 1-8, and optionally includes a process wherein the data relating to the conditions and environments are received from a backend database.

Example No. 10 includes the features of Example Nos. 1-9, and optionally includes a process wherein the plurality of goals is received from a plurality of customers.

Example No. 11 includes the features of Example Nos. 1-10, and optionally includes a process including displaying on the analytical view a value relating to the plurality of goals and a previous value relating to the plurality of goals.

Example No. 12 includes the features of Example Nos. 1-11, and optionally includes a process including comparing the plurality of goals; and determining, based on the comparison, a course of action that has a least effect on a current plan and schedule.

Example No. 13 includes the features of Example Nos. 1-12, and optionally includes a process including receiving additional goals over a time period, and updating the analytical view in response to the additional goals.

Example No. 14 is a machine-readable medium including instructions that when executed by a computer processor execute a process including receiving into the computer processor a plurality of tasks; receiving into the computer processor data relating to conditions and environments associated with the plurality of tasks; receiving into the computer processor a plurality of goals relating to planning and scheduling of the plurality of tasks, wherein the plurality of goals is received from a plurality of sources, and wherein the plurality of goals is addressed as a function of the conditions and environments; and displaying on a user interface, as a function of the plurality of goals, an analytical view of the conditions and environments relating to the plurality of tasks and an analytical view of a status of the plurality of tasks.

Example No. 15 includes the features of Example No. 14, and optionally includes a machine-readable medium wherein the analytical view of the operating conditions and environments comprises a schedule and a map; wherein the schedule and the map comprise a heatmap; wherein the heatmap comprises a plurality of cells, each of the plurality of cells relating to a particular time period and a particular geographic region, and each of the plurality of cells shaded as a function of the plurality of goals; wherein the plurality of shaded cells displays a hot spot; and comprising optimizing the planning and scheduling of the plurality of tasks as a function of the hot spot; and wherein the heat map comprises a geographical map with regional shading as a function of the plurality of goals.

Example No. 16 includes the features of Example Nos. 14-15, and optionally includes a machine-readable medium wherein the analytical view of a status of the plurality of tasks comprises a priority of the plurality of tasks and a completion status of the plurality of tasks; and wherein the analytic view of the completion status of the plurality of tasks comprises a shaded bar graph.

Example No. 17 includes the features of Example Nos. 14-16, and optionally includes a machine-readable medium including instructions for displaying a filtering window on the analytical view; receiving filtering input from a user relating to one or more of a type of resource, an amount of a resource, and a geographic region; and redisplaying the analytical view as a function of the filtering input and the plurality of goals.

Example No. 18 includes the features of Example Nos. 14-17, and optionally includes a machine-readable medium including instructions for comparing the plurality of goals; and determining, based on the comparison, a course of action that has a least effect on a current plan and schedule.

Example No. 19 includes the features of Example Nos. 14-18, and optionally includes a machine-readable medium including instructions for receiving additional goals over a time period; and updating the analytical view in response to the additional goals.

Example No. 20 is a system including a computer processor; a computer memory coupled to the computer processor; and a computer user interface coupled to the computer processor; wherein the computer processor, the computer memory, and the computer user interface are configured for receiving into the computer processor a plurality of tasks; receiving into the computer processor data relating to conditions and environments associated with the plurality of tasks; receiving into the computer processor a plurality of goals relating to planning and scheduling of the plurality of tasks, wherein the plurality of goals is received from a plurality of sources, and wherein the plurality of goals is addressed as a function of the conditions and environments; and displaying on the computer user interface, as a function of the plurality of goals, an analytical view of the conditions and environments relating to the plurality of tasks and an analytical view of a status of the plurality of tasks.

Figure 5:
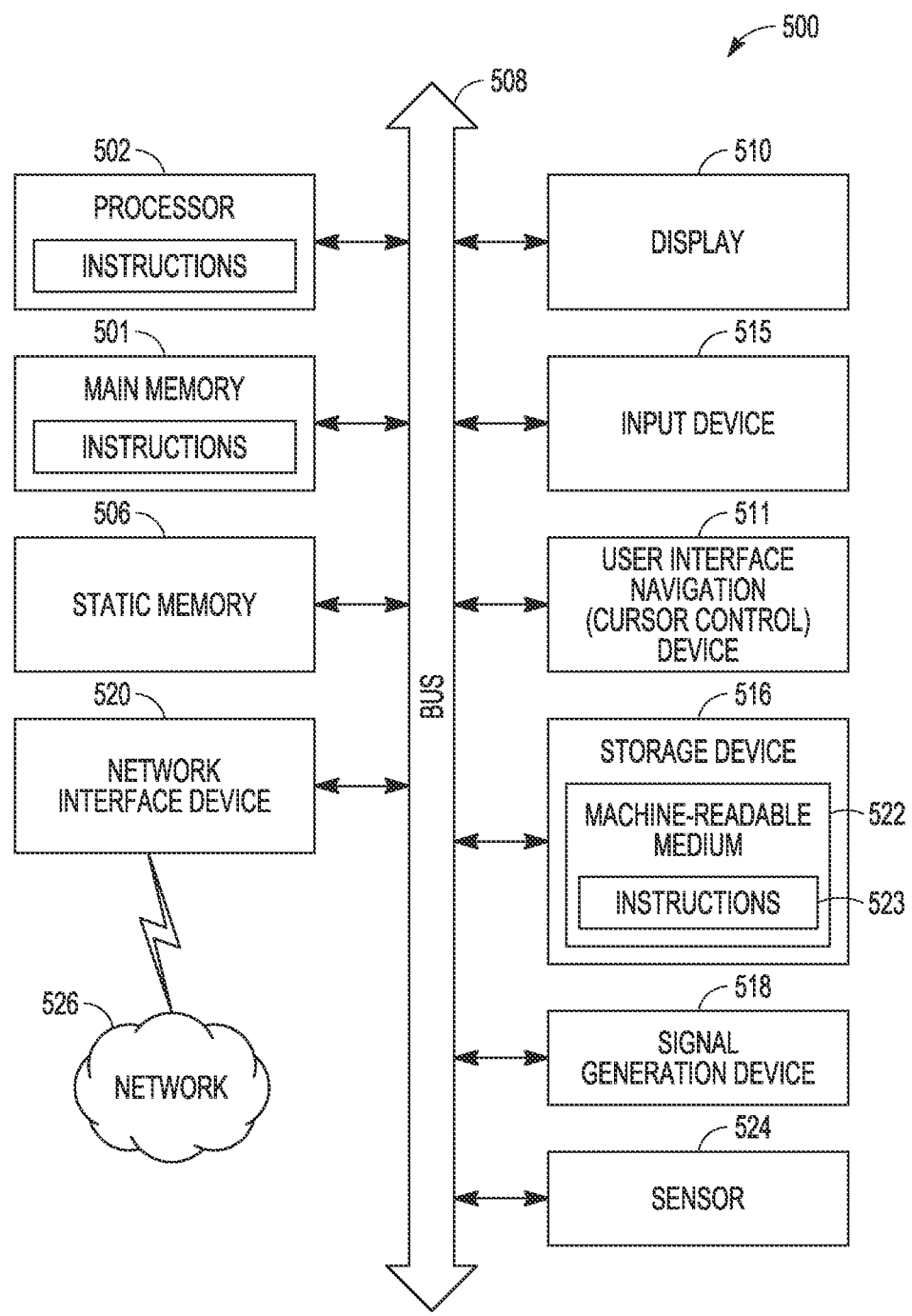
FIG. 5 is a block diagram of a computer architecture upon which one or more of the disclosed embodiments can execute.

FIG. 5 is a block diagram of a machine in the loan of a computer system within which a set of instructions, for causing the machine to perform any one or more of the methodologies discussed herein, may be executed. In alternative embodiments, the machine operates as a standalone device or may be connected (e networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 501 and a static memory 506, which communicate with each other via a bus 508. The computer system 500 may further include a display unit 510, an alphanumeric input device 517 (e.g., a keyboard), and a user interface (UI) navigation device 511 (e.g., a mouse). In one embodiment, the display, input device and cursor control device are a touch screen display. The computer system 500 may additionally include a storage device 516 (e.g., drive unit), a signal generation device 518 (e.g., a speaker), a network interface device 520, and one or more sensors 524, such as a global positioning system sensor, compass, accelerometer, or other sensor.

The drive unit 516 includes a machine-readable medium 522 on which is stored one or more sets of instructions and data structures (e.g., software 523) embodying or utilized by any one or more of the methodologies or functions described herein. The software 523 may also reside, completely or at least partially, within the main memory 501 and/or within the processor 502 during execution thereof by the computer system 500, the main memory 501 and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 523 may further be transmitted or received over a communications network 526 using a transmission medium via the network interface device 520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A process for generating a user interface comprising:
receiving into a computer processor a plurality of tasks;
receiving into the computer processor data relating to conditions and environments associated with the plurality of tasks;
receiving into the computer processor a plurality of goals relating to planning and scheduling of the plurality of tasks, wherein the plurality of goals is received from a plurality of sources, and wherein the plurality of goals is addressed as a function of the conditions and environments;
displaying on the user interface, as a function of the plurality of goals, an analytical view of a heatmap relating to the plurality of tasks and an analytical view of a status of the plurality of tasks, the heatmap comprising a plurality of cells, each of the plurality of cells relating to a particular time period and a particular geographic region, and each of the plurality of cells shaded as a function of the plurality of goals, a shaded cell of the plurality of cells displayed as a hot spot, the hot spot indicating a location at which a goal of the plurality of goals will not be satisfied in accord with the schedule;
receiving, from an operator, by the user interface, and based on the analytical view, an alteration to a schedule of the plurality of tasks that optimizes the schedule and accounts for the hot spot resulting in an altered schedule, the alteration including a change in the goal of the plurality of goals that accounts for the hot spot;
adjusting the heat map in accord with the altered schedule resulting in an updated heatmap and displaying the updated heatmap; and implementing the plurality of tasks in accord with the adjusted schedule that accounts for the hot spot.

2. The process of claim 1, wherein the heat map comprises a geographical map with regional shading as a function of the plurality of goals.

3. The process of claim 1, wherein the analytical view of a status of the plurality of tasks comprises a priority of the plurality of tasks and a completion status of the plurality of tasks.

4. The process of claim 3, wherein the analytic view of the completion status of the plurality of tasks comprises a shaded bar graph.

5. The process of claim 1, comprising:
displaying a filtering window on the analytical view;
receiving filtering input from a user relating to one or more of a type of resource, an amount of a resource, and a geographic region; and
redisplaying the analytical view as a function of the filtering input and the plurality of goals.

6. The process of claim 1, wherein the data relating to the conditions and environments are received from a backend database.

7. The process of claim 1, wherein the plurality of goals is received from a plurality of customers.

8. The process of claim 1, comprising displaying on the analytical view a value relating to the plurality of goals and a previous value relating to the plurality of goals.

9. The process of claim 1, comprising comparing the plurality of goals; and determining, based on the comparison, a course of action that has a least effect on a current plan and schedule.

10. The process of claim 1, comprising receiving additional goals over a time period, and updating the analytical view in response to the additional goals.

11. A non-transitory machine-readable medium comprising instructions that when executed by a computer processor execute a process comprising:
receiving into the computer processor a plurality of tasks;
receiving into the computer processor data relating to conditions and environments associated with the plurality of tasks;
receiving into the computer processor a plurality of goals relating to planning and scheduling of the plurality of tasks, wherein the plurality of goals is received from a plurality of sources, and wherein the plurality of goals is addressed as a function of the conditions and environments;
displaying on a user interface, as a function of the plurality of goals, an analytical view of a heatmap relating to the plurality of tasks and an analytical view of a status of the plurality of tasks, the heatmap comprising a plurality of cells, each of the plurality of cells relating to a particular time period and a particular geographic region, and each of the plurality of cells shaded as a function of the plurality of goals, a shaded cell of the plurality of cells displayed as a hot spot, the hot spot indicating a location at which a goal of the plurality of goals will not be satisfied in accord with the schedule;
receiving, from an operator, by the user interface, and based on the analytical view, an alteration to a schedule of the plurality of tasks that optimizes the schedule and accounts for the hot spot resulting in an altered schedule, the alteration including a change in the goal of the plurality of goals that accounts for the hot spot;
adjusting the heat map in accord with the altered schedule resulting in an updated heatmap and displaying the updated heatmap; and
implementing the plurality of tasks in accord with the adjusted schedule that accounts for the hot spot.

12. The non-transitory machine-readable medium of claim 11, each of the plurality of cells relating to a particular time period and a particular geographic region, wherein the heat map comprises regional shading of the geographic region as a function of the plurality of goals.

13. The non-transitory machine-readable medium of claim 11, wherein the analytical view of a status of the plurality of tasks comprises a priority of the plurality of tasks and a completion status of the plurality of tasks; and wherein the analytic view of the completion status of the plurality of tasks comprises a shaded bar graph.

14. The non-transitory machine-readable medium of claim 11, comprising instructions for:
displaying a filtering window on the analytical view;
receiving filtering input from a user relating to one or more of a type of resource, an amount of a resource, and a geographic region; and
redisplaying the analytical view as a function of the filtering input and the plurality of goals.

15. The non-transitory machine-readable medium of claim 11, comprising instruction for comparing the plurality of goals; and determining, based on the comparison, a course of action that has a least effect on a current plan and schedule.

16. The non-transitory machine-readable medium of claim 11, comprising instructions for receiving additional goals over a time period; and updating the analytical view in response to the additional goals.

17. A system comprising:
a computer processor;
a computer memory coupled to the computer processor; and
a computer user interface coupled to the computer processor;
wherein the computer processor, the computer memory, and the computer user interface are configured for:
receiving into the computer processor a plurality of tasks;
receiving into the computer processor data relating to conditions and environments associated with the plurality of tasks;
receiving into the computer processor a plurality of goals relating to planning and scheduling of the plurality of tasks, wherein the plurality of goals is received from a plurality of sources, and wherein the plurality of goals is addressed as a function of the conditions and environments;
displaying on the computer user interface, as a function of the plurality of goals, an analytical view of a heatmap relating to the plurality of tasks and an analytical view of a status of the plurality of tasks, the heatmap comprising a plurality of cells, each of the plurality of cells relating to a particular time period and a particular geographic region, and each of the plurality of cells shaded as a function of the plurality of goals, a shaded cell of the plurality of cells displayed as a hot spot, the hot spot indicating a location at which a goal of the plurality of goals will not be satisfied in accord with the schedule;
receiving, from an operator, by the user interface, and based on the analytical view, an alteration to a schedule of the plurality of tasks that optimizes the schedule and accounts for the hot spot resulting in an altered schedule, the alteration including a change in the goal of the plurality of goals that accounts for the hot spot;

adjusting the heat map in accord with the altered schedule resulting in an updated heatmap and displaying the updated heatmap; and implementing the plurality of tasks in accord with the adjusted schedule that accounts for the hot spot.

\* \* \* \* \*